United States Patent
Presler-Marshall

(10) Patent No.: US 6,199,094 B1
(45) Date of Patent: *Mar. 6, 2001

(54) PROTECTING SHARED RESOURCES USING MUTEX STRIPING

(75) Inventor: Martin Joseph Clayton Presler-Marshall, Chapel Hill, NC (US)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/093,627

(22) Filed: Jun. 5, 1998

(51) Int. Cl.$^7$ ....................................................... G06F 9/00
(52) U.S. Cl. ............................ 709/104; 709/105; 709/107
(58) Field of Search .................................... 709/104, 105, 709/107; 710/200

(56) References Cited

U.S. PATENT DOCUMENTS

| 4,847,754 | 7/1989 | Obermarck et al. | 709/104 |
| 5,440,746 | 8/1995 | Lentz | 345/504 |
| 5,737,611 | 4/1998 | Vicik | 710/200 |
| 5,790,851 | 8/1998 | Frank et al. | 709/104 |
| 5,842,015 | 11/1998 | Cunniff et al. | 709/104 |

*Primary Examiner*—Alvin E. Oberley
*Assistant Examiner*—Van Nguyen
(74) *Attorney, Agent, or Firm*—A. Bruce Clay; Marcia L. Doubet

(57) ABSTRACT

A technique, system, and computer program for improving access to shared resources in a computing system. The shared resources are grouped into application-defined resource sets. Mutual exclusion semaphores are used. A semaphore is associated with each resource set to provide mutually-exclusive (serialized) access to the resources in the set. The number of semaphores will be smaller (typically, much smaller) than the number of resource sets, so that a given semaphore will be associated with multiple of such sets. Thus, the set of semaphores is striped across the collection of resource sets. This greatly increases allowable parallelism in accessing shared resources, while reducing the number of semaphores that are required.

12 Claims, 4 Drawing Sheets

PROTECTING SHARED RESOURCES USING MUTEX STRIPING

BACKGROUND OF THE INVENTION

1. Field of the Invention

The present invention relates to computer performance, and deals more particularly with a technique, system, and computer program for protecting shared resources in a novel, efficient manner using mutual exclusion semaphores, whereby the number of semaphores required is greatly reduced.

2. Description of the Related Art

Many modern computer programs are written to take advantage of multiprogramming, whereby more than one program appears to execute concurrently. The appearance of concurrency is achieved by allowing each of the multiple programs to execute for some limited period of time, followed by execution of a different one of the multiple programs. This execution for a limited time is repeated over and over, allocating use of the central processing unit (CPU) to the multiple programs by what is known in the art as "time slicing". Multiple threads may execute within a single process, implementing yet another type of concurrent use of the CPU. A process is an instance of a running program. A thread is a single execution path within such a program. Operating systems provide built-in mechanisms for switching between concurrent programs and/or threads in a very quick and efficient manner. Because the switching occurs so quickly, it appears that the concurrent programs and/or threads are executing in parallel (although they are actually executing in serial). Because the concepts of the present invention apply equally to concurrent programs and concurrent threads, those terms are used interchangeably herein.

As various applications execute, they invariably need to access the resources of the system. Shared use of the CPU resource has been briefly discussed above, with reference to time slicing. Other sharable resources of the system that the concurrent programs may need access to include memory and disk files. It is necessary for these sharable resources to be shared in such a manner that the integrity of the data contained therein is protected. (Note that the phrases "shared resource" and "sharable resource" are used interchangeably herein.)

For purposes of illustrating the concerns for concurrent access to sharable resources, suppose the resource of interest is payroll information, and two of the concurrently-executing programs are payroll programs. The first program may read the stored value of the year-to-date salary for each employee, add the current pay period salary to that figure, and rewrite the updated value. The second program may be a program for printing income tax information. This second program must be properly synchronized with the first, so that all values are printed from the updated information, or from the non-updated information, depending on the details of the programs and the timing in which they are executed: if information for some employees is printed using updated information, and information for other employees is printed using non-updated information, the tax information will be inconsistent and inaccurate.

While it is unlikely that two programs of the specific nature used in this example would be executed concurrently, the example provides an illustration of the problems that may occur in the general situation where one program reads and writes data, and any other program also needs to access that data.

A typical solution to allowing multiple programs or threads to access sharable resources, while protecting the integrity of those resources, is to use a mutual-exclusion semaphore (also referred to in the art as a binary semaphore, or mutex semaphore, where "mutex" is an abbreviation for "mutual exclusion"). A semaphore is a protected variable provided by the operating system. The semaphore serializes access to the shared resource, so that use of the resource by multiple programs is mutually exclusive: if one program is using the resource, then any other program that wants access to that resource must wait. This mutual exclusion by serialized access will be referred to herein as "protecting" or "locking" the shared resource. When exclusive access to the shared resource is no longer required, the program holding the semaphore releases the semaphore, which "unlocks" the resource. ("Holding" a semaphore signifies that a user is using the semaphore to protect a shared resource.) A binary semaphore is implemented using a variable that takes on only the values zero and one. When the value is zero, this indicates that no user is holding the semaphore, and the sharable resource is not currently being accessed. When a program wishes to access that resource, the semaphore is incremented to the value one. Other programs interested in accessing the resource will detect that it is being used, and is not available, by seeing that the semaphore value has been set to one. The concepts of semaphores, and how they are implemented in order to provide mutual exclusion, are well known in the art. Reference may be made to "An Introduction to Operating Systems", by H. M. Deitel and published by Addison-Wesley, pp. 89–95 (1983), for an explanation of semaphores.

In addition to the need to serialize access to sharable resources in general, the information represented therein may need to be protected on a finer level of granularity. For example, if the information to be protected occupies a large amount of memory, limiting access to all the applicable memory locations as a single unit will likely result in operating inefficiencies. For example, suppose the memory locations represent one or more large records from a database. When the thread using those records is swapped out (that is, its time slice ends, and it therefore stops executing temporarily) and a different thread begins executing, that subsequent thread may also require access to the records in memory. If they are locked by the thread that has swapped out, then this current thread cannot access them and therefore cannot do productive work, and will waste its time slice. By protecting the information at more granular levels, for example by locking only the specific record being accessed, the likelihood of the second thread being able to gain access to the data it needs is greatly increased.

Commonly, providing granular access to sharable resource is achieved by grouping the resources into logical sets, whereby one semaphore protects access to all members of the set. The set members will be referred to herein as "objects", although this is not meant to imply that applicability is limited to object-oriented programming systems. An object may be any type of data representation, such as a single record or field. Alternatively, it may be a more complicated data structure such as a tree or table.

Two techniques for protecting the objects in a set are known in the art. The first technique is to use one mutual-exclusion semaphore to protect the entire set, and the second is to use one semaphore for each object in the set. The limitations of each of these approaches will now be discussed.

The first technique (using one semaphore for the entire set of objects) is simplest to implement. It is also the more general solution, because it allows set membership to easily change during operation. (For example, if an entire table is being protected, any new rows added to that table as a thread executes will automatically be protected.) However, there is a significant serialization penalty inherent in this technique, in that different threads may need access to different set members. These multiple threads cannot access the set members in parallel because access to the entire set is limited to the single thread which is holding the semaphore. As each thread begins its time slice, it will find the resource it needs unavailable, as discussed earlier, and will thus give up its turn to access the CPU. Therefore, more granular access to the objects is needed than is provided by this first technique.

The second technique (using one semaphore for each set member) maximizes parallelism in the system: since each set member has its own semaphore, theoretically one thread could be accessing each member without encountering a member that was locked by another thread. However, this is a very expensive solution, and is more difficult to implement. It is expensive in terms of system resources, that is, the semaphores themselves require additional processing operations (checking the status of the semaphore each time access to a protected resource is needed, setting the semaphore to show that the resource is in use, blocking a thread that finds a resource locked and therefore unavailable, etc.). It is obvious that system memory is required for storing the status of each semaphore, and that this memory must be defined as non-swappable—that is, as the operating system brings new data into memory, the memory locations being used for semaphores cannot be overwritten. For these reasons, operating systems place limits on the number of semaphores that can be defined. A typical limit will be on the order of $2^{16}$, or approximately 64,000 semaphores. Thus, this approach is unusable for systems that have data structures with tens or hundreds of thousands of members, where it is desired to provide some type of granular access protection. Even where the number of sharable resources is relatively small (on the order of several hundred, for example), this second technique results in an inefficient use of constrained resources, as will be shown by the more efficient technique defined by the present invention.

Accordingly, what is needed is a more efficient manner of protecting access to sharable resources in a multiprogramming environment, optimizing the tradeoff between the number of semaphores required and the level of granularity at which those semaphores are associated with sets of resources.

SUMMARY OF THE INVENTION

An object of the present invention is to provide an improved technique for access to shared resources.

Another object of the present invention is to provide this technique using mutual-exclusion semaphores.

It is another object of the present invention to provide this technique in such a manner that the tradeoff between the number of semaphores required, and the granularity of resource protection, can be optimized.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer-readable code for use in a computing system, for improving shared access to resources. This comprises a plurality of sharable resources, a plurality of semaphores, a subprocess for grouping the sharable resources into a plurality of resource sets (each of the sharable resources being a member of only one of the resource sets), and a subprocess for associating each of the plurality of semaphores with one or more of the resource sets. The computing system may reside in a computer network. The subprocess for associating semaphores preferably further comprises a subprocess for repeatedly executing a first loop, which sequentially steps through a range of sequence numbers representing each of the plurality of semaphores. Alternatively, the subprocess for associating semaphores further comprises a subprocess for repeatedly executing a second loop, which assigns a selected one of the plurality of semaphores to a range of the one or more associated resource sets.

The present invention will now be described with reference to the following drawings, in which like reference numbers denote the same element throughout.

DESCRIPTION OF THE PREFERRED EMBODIMENT

Figure 1:
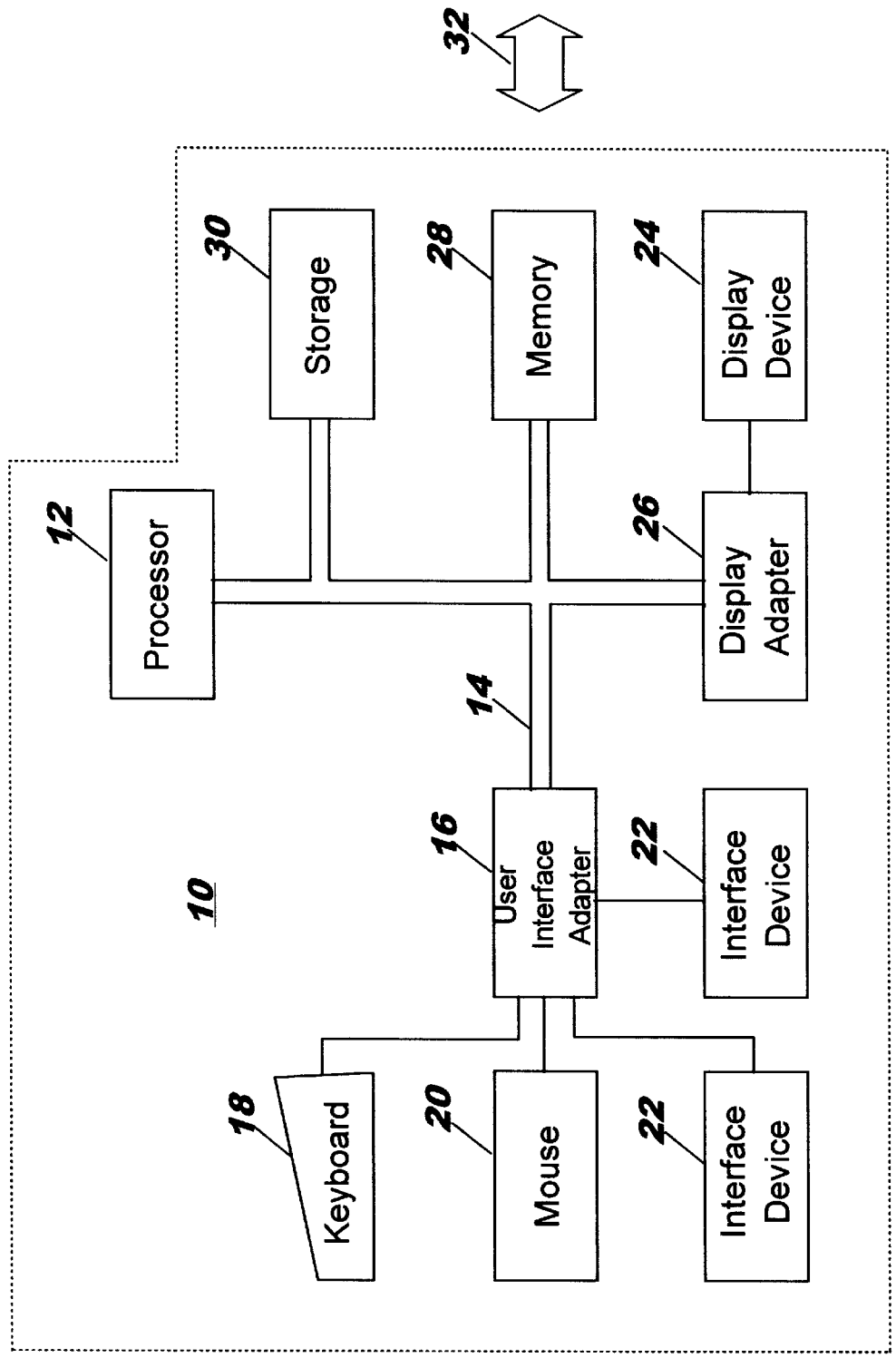
FIG. 1 is a block diagram of a computer workstation environment in which the present invention may be practiced.

FIG. 1 illustrates a representative workstation hardware environment in which the present invention may be practiced. The environment of FIG. 1 comprises a representative computer or intelligent workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate via a communications channel 32 with other computers or networks of computers. The workstation 10 may be associated with such other computers in a local area network (LAN) or a wide area network, or the workstation 10 can be a client in a client/server arrangement with another computer, etc. All of these configurations, as well as the appropriate communications hardware and software, are known in the art.

Figure 2:
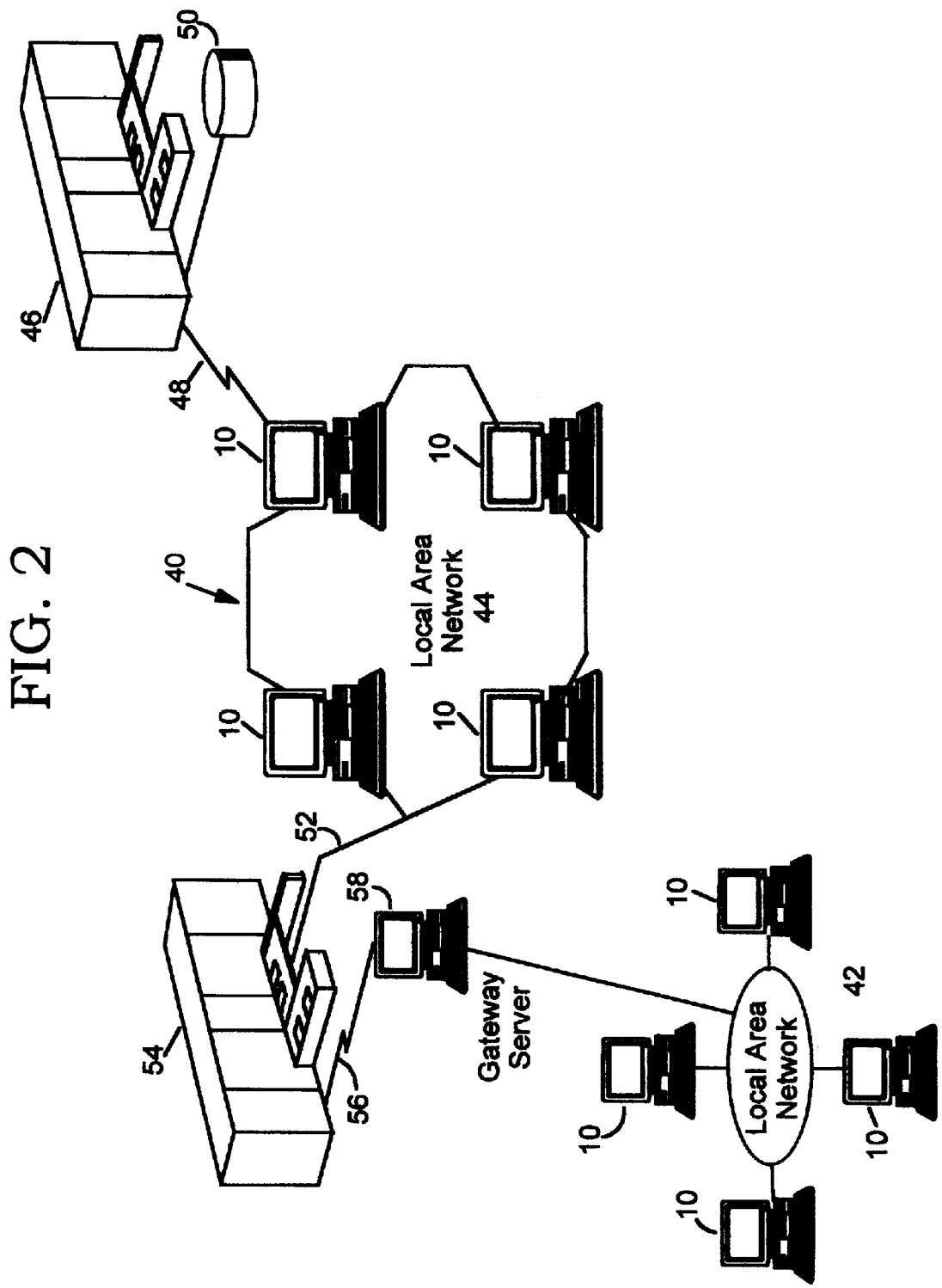
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers or servers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from IBM. Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a client-server environment, such software programming code may be stored with storage associated with a server. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The client-server environment in which the present invention may be used includes an Internet environment, or an intranet environment. Additionally, the present invention may be practiced in an environment structured according to a three-tiered architecture, whereby a client-server environment is extended by adding data repositories as a third tier (such that the server now occupies the middle tier).

While servers in client-server or three-tier environments may not typically include a display device 24, the preferred embodiment of the present invention uses a display device 24 in order to allow configuration of parameters (for example, by a system administrator) that may be used to optimize performance of a computing system using the present invention.

Figure 3:
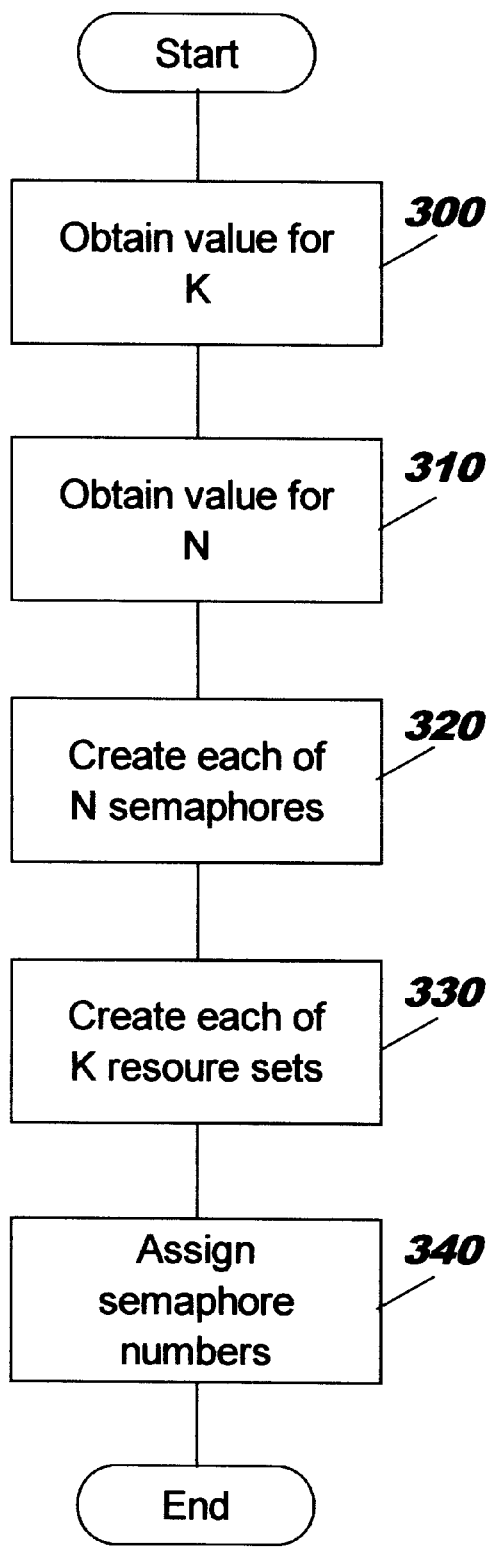
FIG. 3 illustrates a flowchart depicting an initialization process that may be used to prepare for operation of the semaphores and resource sets of the present invention.

The preferred embodiment of the present invention will now be discussed with reference to FIGS. 3 and 4.

In the preferred embodiment, the present invention is implemented as a computer software program. The program code of the preferred embodiment may be implemented as objects (classes and methods) in an object-oriented programming language such as Smalltalk, or as instructions in a conventional procedural programming language (such as the "C" programming language).

The technique of the present invention is referred to herein as "mutex striping", where "mutex" is a commonly-known abbreviation for "mutual exclusion", as previously stated. "Striping" is a term known in the art, which has been used to represent the concept of dividing a file that is to be stored on disk into a number of smaller units, and storing each unit on a different physical disk drive in order to speed disk access time. As applied to the present invention, striping refers to dividing a number of objects (i.e. sharable resources) into sets, and using one semaphore for protecting the members of each set. This technique for doing this will be apparent from the following discussion.

As defined by the present invention, mutex striping provides a third technique for guaranteeing safe access to shared objects. This novel technique differs from both the first and second techniques discussed earlier. It differs from the first technique in that resources are protected at a more granular level: instead of protecting all resources with a single semaphore, resource objects are grouped into sets, and one semaphore is used to protect the members of each set. It differs from the second technique in that resources are protected at a less granular level: instead of protecting each resource with its own semaphore, only a set has its own semaphore, where a set consists of some number of resources.

The present invention allows protection of a potentially vast number of resources, using a small number of semaphores. The resources are grouped into sets, as previously discussed. The number of, and relationship between, resources in any particular set depends on the needs of the application programs using those resources. Additional factors, such as the mix of programs executing concurrently at any given time, may also influence an optimal choice of set composition. Thus, the present invention defines a generic technique that is independent of which resources have been grouped together.

According to the preferred embodiment of the present invention, sequence numbers are logically assigned to each set and to each semaphore. Let K represent the number of resource sets, and let N represent the number of semaphores to be used. Then a single semaphore is used to protect the objects in multiple sets according to the equation (K mod N). This reuse of one semaphore for multiple sets has the effect of "striping" the semaphores across the resources of the system.

A program making use of the present invention will build sets of objects (sharable resources), define semaphores, and associate a semaphore with each set during an initialization phase. FIG. 3 illustrates the logic of an initialization phase that may be used for the present invention. At Step 300, the value of K (the total number of resource sets) is obtained. The program may be written to use a static value for K, or may include code to prompt a user (such as a system administrator) to enter a value for K. Techniques for implementing either approach are well known to one of ordinary skill in the art. At Step 310, the value of N (the total number of semaphores to be used) is obtained. Again, the value of N may be a static value, or may be obtained dynamically from a system user or administrator.

In a preferred embodiment, the value to be used for N (that is, the number of semaphores to be used for operation of the present invention) is the number of threads that are expected to be concurrently executing in the system. Other values may be used, however. When the embodiment of the present invention is written to allow this value to be entered dynamically during the initialization phase, the number of semaphores may be changed based upon observation of the performance of the system, to fine tune operation of the computing system. Additionally, the number of semaphores may be changed as the number of resources (or resource sets) changes: for example, if the number of resource sets is increased (by increasing the value of K at Step 300), some corresponding increase in the number of semaphores may be warranted for optimal performance using the present invention.

At Step 320, each of the N semaphores is created. The manner in which a semaphore is created will depend on the programming language in which the code implementing the initialization phase is written. In a typical procedural language, a variable type of "semaphore" is predefined, and the step of creating the semaphores may comprise no more than variable definitions that have been written into the code, where those variable definitions assign some variable name to each of N variables having this variable type. Or, an executable statement may be processed at run-time for each such variable, assigning memory to it and initializing the memory contents to zero. Because there may be a fairly large number of semaphore variables, it is preferable to represent the semaphores as an array, whereby each individual semaphore can then be accessed by indexing this array. In the "C" programming language, the following code fragment illustrates this procedure of defining the semaphores, assigning memory to them, and initializing the value of the memory:

```
pthread_mutex_t *MakeSemaphore(void)
{
    pthread_mutex_t *new_semaphore;
    pthread_mutexattr_t semaphore_attributes;
    /* Initialize the semaphore attributes to their default. */
    pthread_mutexattr_init(&semaphore_attributes);
    /* Allocate memory for the semaphore. */
    new_semaphore = malloc(sizeof(pthread_mutex_t));
    /* Create the semaphore, using the attributes object initialized
    above. */
    pthread_mutex_init(new_semaphore, &semaphore_attributes);
    /* Done! */
    return(new_semaphore);
}
```

(Refer to "Standard C", by P. J. Plauger & Jim Brodie, published by Microsoft Press (1989), for an explanation of the syntax of these statements.)

In an object-oriented programming language, creating a semaphore may be accomplished by instantiating an instance of a semaphore class. Typical object-oriented programming languages include such classes as part of their object library. As with procedural languages, the semaphore value is also set to zero at this point in the initialization phase. Techniques for instantiating instances, and initializing them, are well known to one of ordinary skill in the art.

Resource objects are grouped into sets at Step 330. The specific technique for grouping objects will be application-dependent, and does not form part of the inventive concepts of the present invention. What is required for purposes of the present invention is that sets containing one or more objects are created, and made available to the embodiment of the present invention.

Step 340 indicates that the initialization process will associate a semaphore with each resource set. It will be obvious to one of ordinary skill in the art that this sequence number may be assigned at a different step of the process, without deviating from the inventive concepts of the present invention. For example, it may be more efficient to assign semaphore sequence numbers to sets as the set membership is defined (in Step 330). The manner in which the semaphore number is stored, to indicate its association with the resource set, does not form part of the present invention. A field may be defined in a storage area where the set members are defined, for example, to store the semaphore number.

Further, any numbering approach may be used without deviating from the inventive concepts of the present invention, and may depend upon the type of resources. For example, if the resource has a tree structure, the resource sets may be defined as containing one or more nodes of that tree. When grouping the nodes, the tree may be traversed breadth-first, and numbers assigned according to this traversal. Alternatively, the tree may be traversed depth-first, and numbers assigned in that manner.

If the sharable resource to be protected is in the form of a table instead of a tree, the resource set may be defined as containing a single cell of the table, or some grouping of multiple cells. In the latter case, the cells in one group (and therefore in a resource set) may comprise a single column of the table, a single row of the table, or some other arbitrary grouping (including the complete table). Again, the composition of the set is application-dependent, based on how the programmer who wrote the grouping code envisioned the resources could optimally be protected, and the granularity of access protection that is provided by grouping resources into a certain number of resource sets.

Different approaches to associating a semaphore with a resource set may be used, without deviating from the inventive concepts of the present invention. In the preferred embodiment, the expression (I mod N), where I is a counter that takes on each of the values $0 \leq I \leq (K-1)$, is executed repeatedly while stepping sequentially through each of the resource sets. Semaphore numbers are assigned to sets in sequence according to that expression. For example, if N has the value 3, then the 3 semaphores to be used can be designated using the values (0, 1, 2). The first resource set will be associated with semaphore number 0 by evaluating (I mod N) as (0 mod 3). The second resource set is associated with semaphore 1 by evaluating (I mod N) as (1 mod 3), and the third with semaphore 2 by evaluating (I mod N) as (2 mod 3). Semaphore number 0 is assigned again, to the fourth resource set, by evaluating (3 mod 3). This process repeats until all of the K resource sets have semaphore numbers associated with them. (It will be obvious to one of ordinary skill in the art that the zero-based counting explained here for the counter "I" can be changed to counting from 1 to the value K, where semaphore numbers of this example would then be assigned in the order 1, 2, 0, without deviating from the inventive concepts of the present invention.)

It will be recognized that the number of resource sets protected by a given semaphore is approximately (K÷N). That is, where this expression does not evaluate to an integer, then some of the semaphores will protect ((K÷N)+1) resource sets, and some will protect (K÷N) sets. In an alternative embodiment of the numbering technique, assignment of semaphore numbers can be implemented by using the ceiling of the expression (K÷N), and repeatedly assigning a semaphore sequence number for the number of sets represented by that result. Once that many sets have been associated with a given sequence number, the sequence number is incremented, and this new number is repeatedly assigned in the same manner. For example, assume that K=11 and N=3. Semaphore 0 will then be associated with 4 of the sets (because the ceiling of (11÷3) is 4). The first 4 resource sets are therefore processed sequentially, assigning semaphore 0 to be associated with each set. Then, the next 4 resource sets (logically numbered 4 through 7, if counting of the sets begins with 0) are processed, associating semaphore 1 with each set. The remaining 3 sets are then associated with the final semaphore, semaphore number 2.

In any numbering technique that associates N semaphores with K resource sets according to the present invention, where N may be much smaller than K, the advantages of the present invention can be achieved.

Figure 4:
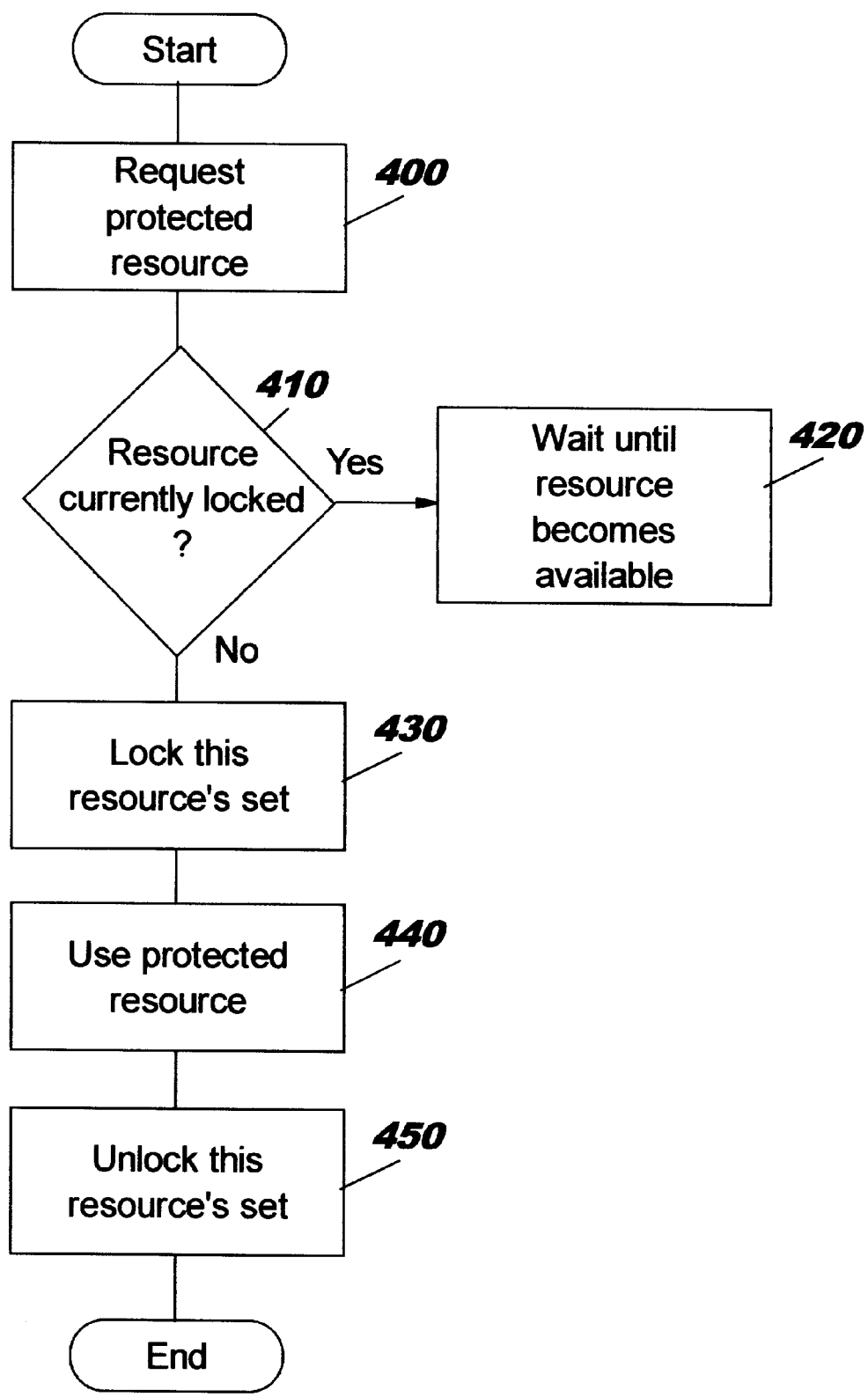
FIG. 4 illustrates a flowchart of the process with which the semaphores and resource sets of the present invention may be used.

FIG. 4 illustrates how the semaphores will operate to protect the shared resources according to the preferred embodiment. At Step 400, an executing program requests access to a resource. For example, the program may wish to read a value from a payroll record, as previously discussed. Step 400 represents that program issuing a "read" request. Step 410 indicates that the processing will be different, depending on whether or not the set of which that resource is a member is currently locked (that is, whether the semaphore for the set indicates that access to the resource set is prevented). If the resource set is locked, then this program must wait until the resource set becomes available, as shown by transferring control to Step 420. According to a typical operating system approach, the execution state of the program is changed from "running" to "blocked" at this point, and an entry representing the program is placed onto a queue that is used to serialize access to the resource (in this case, the resource set) protected by the semaphore. If the resource set is not locked, but is instead available for use by this requesting program, then control transfers to Step 430. At Step 430, the appropriate semaphore is locked (where the appropriate semaphore is the one associated with the resource set of which the requested resource is a member). For a mutual exclusion semaphore, the semaphore locking typically comprises incrementing the semaphore value from zero to one, as previously stated. Step 440 indicates that the requesting program uses the resource from the locked resource set. The specific manner in which the resource is used is application-dependent. At some point, the program will finish using the resource. The program must then release the semaphore for the resource set, as shown by Step 450. For a mutual exclusion semaphore, this typically comprises decrementing the semaphore value from one to zero, as previously stated.

The steps illustrated in FIG. 4 are known in the art, and represent generally the approach that is followed for using mutual exclusion semaphores. However, in the prior art, the locked or released status of any given semaphore represents the availability of either all sharable resources (described earlier as "the first technique") or the availability of a single resource (described earlier as "the second technique"). The present invention changes what it means to lock a semaphore, and for a semaphore to be released. As implemented with mutex striping, a resource set (and the requested resource in that set) may be locked even though no other program is using that resource or any resource in its set. When a specific semaphore is locked, using mutex striping, all of the resource sets that are associated with that (re-used) semaphore are made unavailable to the programs not holding the semaphore—regardless of which of the resource sets actually contains the resource being accessed. Releasing a specific semaphore then unlocks each of the resource sets associated with the semaphore.

Reusing semaphores (that is, assigning a semaphore to more than one resource set) according to the present invention may lead to occasional collisions. In this context, a collision is a request for a resource, where that request must block because the semaphore protecting the resource set is being used to protect some other resource set. For example, suppose a thread wants to access resource "ABC", which is in resource set number 123, and a different thread is currently accessing resource "XYZ" in resource set number 789 (and therefore holds the semaphore associated with that resource set). If both resource set 123 and resource set 789 are protected by the same semaphore, then a semaphore collision occurs because access to resource "ABC" is prevented even though no resource in set 123 is currently being accessed. However, if semaphore numbers are assigned to resource sets in sequential order (according to the first numbering technique described for Step 340), and if requests for resources is essentially random, then collisions will occur infrequently. If requests for resources do not follow a random pattern, the number of collisions may be reduced by changing the composition of the groups, using a different numbering pattern, increasing the number of semaphores, and/or increasing the number of resource sets. The present invention provides this flexibility as part of an overall solution to allowing greatly increased parallel access to shared resources over the approaches known in the prior art.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed:

1. In a computing system, computer-readable code embodied on one or more computer-readable media readable by said system for improving shared access to resources, comprising:

a subprocess for grouping a plurality of sharable resources into a plurality of resource sets, each of said sharable resources being a member of only one of said resource sets;

a subprocess for associating each of a plurality of semaphores with one or more of said resource sets, at least one of said semaphores being concurrently associated with more than one of said resource sets, wherein a number of said resource sets to be concurrently associated with each semaphore is determined by evaluating an expression (K modulo N) wherein "K" represents a count of said resource sets and "N" represents a count of said semaphores and wherein N is less than K; and a subprocess for locking a selected sharable resource, said selected sharable resource being one of said members of a selected resource set, using a selected semaphore associated with said selected resource set, thereby also locking all of said sharable resources which are grouped into all of said one or more resource sets associated with said selected semaphore.

2. Computer readable code for improving shared access to resources according to claim 1, wherein said computing system resides in a computer network.

3. Computer-readable code for improving shared access to resources according to claim 1 or claim 2, wherein said subprocess for associating semaphores further comprises a subprocess for sequentially assigning each successive result of an expression (I modulo N), wherein I is a counter successively stepping through a range of values between 0 and (K−1), to a successive value of K.

4. Computer-readable code for improving shared access to resources according to claim 1 or claim 2, wherein said subprocess for associating semaphores further comprises a subprocess for assigning each successive one of said plurality of semaphores to a sequential range of values of K, wherein a particular number of said values of K to be assigned to said successive one of said semaphores is determined using a result of said expression.

5. A system for improving shared access to resources in a computing system, comprising:

a plurality of sharable resources;

a plurality of semaphores;

means for grouping said sharable resources into a plurality of resource sets, each of said sharable resources being a member of only one of said resource sets;

means for associating each of said plurality of semaphores with one or more of said resource sets, at least one of said semaphores being concurrently associated with more than one of said resource sets, wherein a number of said resource sets to be concurrently associated with each semaphore is determined by evaluating an expression (K modulo N) wherein "K" represents a count of said resource sets and "N" represents a count of said semaphores and wherein N is less than K; and means for locking a selected sharable resource, said selected sharable resource being one of said members of a selected resource set, using a selected semaphore associated with said selected resource set, thereby also locking all of said sharable resources which are grouped into all of said one or more resource sets associated with said selected semaphore.

6. The system for improving shared access to resources according to claim 5, wherein said computing system resides in a computer network.

7. The system for improving shared access to resources according to claim 5 or claim 6, wherein said means for associating semaphores further comprises means for sequentially assigning each successive result of an expression (I modulo N), wherein I is a counter successively stepping through a range of values between 0 and (K−1), to a successive value of K.

8. The system for improving shared access to resources according to claim 5 or claim 6, wherein said means for associating semaphores further comprises means for assigning each successive one of said plurality of semaphores to a sequential range of values of K, wherein a particular number of said values of K to be assigned to said successive one of said semaphores is determined using a result of said expression.

9. A method for improving access to shared resources in a computing system, comprising the steps of:

grouping a plurality of sharable resources into a plurality of resource sets, each of said sharable resources being a member of only one of said resource sets;

associating a plurality of semaphores with one or more of said resource sets, at least one of said semaphores being concurrently associated with more than one of said resource sets, wherein a number of said resource sets to be concurrently associated with each semaphore is determined by evaluating an expression (K modulo N) wherein "K" represents a count of said resource sets and "N" represents a count of said semaphores and wherein N is less than K; and locking a selected sharable resource, said selected sharable resource being one of said members of a selected resource set, using a selected semaphore associated with said selected resource set, thereby also locking all of said sharable resources which are grouped into all of said one or more resource sets associated with said selected semaphore.

10. The method for improving shared access to resources according to claim 9, wherein said computing system resides in a computer network.

11. The method for improving shared access to resources according to claim 9 or claim 10, wherein said associating semaphores step further comprises sequentially assigning each successive result of an expression (I modulo N), wherein I is a counter successively stepping through a range of values between 0 and (K−1), to a successive value of K.

12. The method for improving shared access to resources according to claim 9 or claim 10, wherein said associating semaphores step further comprises assigning each successive one of said plurality of semaphores to a sequential range of values of K, wherein a particular number of said values of K to be assigned to said successive one of said semaphores is determined using a result of said expression.

* * * * *